United States Patent
Satou et al.

(10) Patent No.: US 9,385,564 B2
(45) Date of Patent: Jul. 5, 2016

(54) STATOR OF DRIVE MOTOR FOR ELECTRICALLY OPERATED VALVE

(71) Applicant: FUJIKOKI CORPORATION, Tokyo (JP)

(72) Inventors: Masaya Satou, Tokyo (JP); Satoshi Uehara, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 635 days.

(21) Appl. No.: 13/845,867

(22) Filed: Mar. 18, 2013

(65) Prior Publication Data

US 2013/0285481 A1 Oct. 31, 2013

(30) Foreign Application Priority Data

Apr. 25, 2012 (JP) ................................ 2012-100111

(51) Int. Cl.
| | | |
|---|---|---|
| H02K 15/10 | (2006.01) | |
| H02K 15/00 | (2006.01) | |
| H02K 1/12 | (2006.01) | |
| H02K 15/14 | (2006.01) | |
| H02K 5/08 | (2006.01) | |
| H02K 5/10 | (2006.01) | |
| H02K 1/14 | (2006.01) | |
| H02K 15/12 | (2006.01) | |

(52) U.S. Cl.
CPC ................ *H02K 1/12* (2013.01); *H02K 1/145* (2013.01); *H02K 5/08* (2013.01); *H02K 5/10* (2013.01); *H02K 15/10* (2013.01); *H02K 15/12* (2013.01); *H02K 15/14* (2013.01)

(58) Field of Classification Search
CPC ............. H02K 5/08; H02K 5/12; H02K 5/14; H02K 15/10; F16K 31/04; F16K 31/041
USPC ....................................... 310/43, 257
See application file for complete search history.

(56) References Cited

U.S. PATENT DOCUMENTS

| | | | | |
|---|---|---|---|---|
| 6,473,958 | B2 * | 11/2002 | Miyoshi | .................. H02K 7/06 251/129.11 |
| 2006/0175565 | A1 * | 8/2006 | Nungesser | .......... F16K 27/0254 251/129.11 |
| 2009/0294713 | A1 * | 12/2009 | Harada | .................. F16K 31/04 251/129.15 |

FOREIGN PATENT DOCUMENTS

| | | |
|---|---|---|
| JP | 2000262024 A | 9/2000 |
| JP | 2009287663 A | 12/2009 |

* cited by examiner

*Primary Examiner* — Burton Mullins
(74) *Attorney, Agent, or Firm* — Bacon & Thomas, PLLC

(57) ABSTRACT

The invention intends to improve a stator which is detachably installed to an outer peripheral portion of a can accommodating a rotor. The stator is integrally formed with a resin mold by arranging a stator assembly (110) within metal molds (300, 310) and injecting a molten resin (P1) from a gate (G1) at one position. An annular plate (160) is mounted to an upper portion of the stator assembly (110) so as to prevent the molten resin from intruding into magnetic pole teeth (120a, 122a), and prevent a weld line from being generated in an outer peripheral surface of the resin mold.

5 Claims, 5 Drawing Sheets

STATOR OF DRIVE MOTOR FOR ELECTRICALLY OPERATED VALVE

BACKGROUND OF THE INVENTION

1. Field of the Invention

The present invention relates to a stator of a drive motor which is equipped for an electrically operated valve used for controlling a flow rate of a cooling medium which circulates in a refrigeration cycle.

2. Description of the Conventional Art

JP-A-2009-287663 discloses this kind of electrically operated valve.

The electrically operated valve is provided with a valve mechanism within a valve main body, and a sealed container called as a can is attached to an upper portion of the valve main body. A rotor of a driving motor is equipped in an inner portion of the can, and a turning force of the rotor is converted into a motion in a linear direction by a screw mechanism so as to operate a valve member. The valve member linearly moves so as to control a valve opening degree. A stator of the driving motor is detachably mounted to an outer peripheral portion of the can.

The stator is structured such that a stator assembly having a coil wound around magnetic pole teeth of a yoke is set within a metal mold for a resin molding, and a molten resin is supplied into the metal mold, whereby the stator assembly is integrally formed by a synthetic resin.

In the electrically operated valve mentioned above, in order to make a magnetic gap between the stator and the rotor as small as possible, the magnetic pole teeth of the yoke arranged within the stator are exposed to an inner portion of the stator, however, the other portions than a portion which is opposed to the can in the magnetic pole teeth are molded by the resin, so as to prevent a moisture from intruding into the coil within the stator from an external portion.

In JP-A-2009-287663, there is disclosed a technique which prevents water from intruding into a portion between the can and the stator, by providing a seal member between a lower portion of the stator and a lower portion of the valve main body or the can, in order to further securely prevent the moisture intrusion.

In JP-A-2000-262024, there is disclosed an example of a molding method of the stator for the electrically operated valve. As mentioned above, since it is necessary for the stator to be molded by the resin in the other portions than the portion which is opposed to the can in the magnetic pole teeth, a yoke accommodating a coil wound around a bobbin is structured such as to be injected the resin from a plurality of gates.

FIGS. 5 to 7 show a structure of a stator of a drive motor for a conventional electrically operated valve. A coil 140 wound around a bobbin 130 is retained from above and below by an outer yoke 120 which is provided with magnetic pole teeth 120*a*, and an inner yoke 122 which is provided with magnetic pole teeth 122*a*. Further, a stator assembly 110 is constructed by bringing two sets of retaining bodies into contact with each other so as to be opposed to each other and positioning them. In the stator assembly 110, a resin mold 200 is formed around the stator assembly 110 so that only inner surfaces (inward directed surfaces of the stator) of the magnetic pole teeth 120*a* and 122*a*, and a lead pin 141 drawn out of the coil 140 are exposed.

The resin mold 200 is formed, for example, according to the following manner. In other words, the stator assembly of a stator 100' is set within a metal mold which is not illustrated, and the resin is injected into the metal mold from an upper gate G1 and lower gates, for example, three lower gates G2, G3 and G4.

The stator assembly 110 is integrally formed with the resin mold 200 and the stator 100' is finished.

As mentioned above, in an inner peripheral surface of the stator 100', it is necessary to circulate the resin in the other portions than the inner surfaces of the magnetic pole teeth 120*a* and 122*a*. Accordingly, it is necessary for the resin injected from the gates provided in an outer periphery of the stator to be guided to the inner peripheral surface side of the stator after passing through a complicated internal structure portion of the stator assembly.

Therefore, in the conventional manufacturing method, since the molding operation is carried out in the multiple points of gates (for example, four gates) which are provided in the upper and lower sides of the metal mold, so that the molten resin is circulated around the stator, a weld line WL is generated in an outer peripheral portion of the resin mold 200.

The weld line is a re-melting position of the resin in the resin molding, and a mechanical strength of the re-melting position is lowered in comparison with the other molded surfaces.

In the case that an electrically operated valve using the stator is mounted, for example, to a motor vehicle or a marine vessel, an environmental temperature range in an air temperature and a low temperature becomes large, and a temperature fluctuation do damage to the coil resin part. Therefore, a crack is generated in the weld line portion, and there is a risk that a deterioration of an insulating performance is caused by a water intrusion from the crack position.

SUMMARY OF THE INVENTION

Problem to be Solved by the Invention

An object of the present invention is to provide a stator of a drive motor for an electrically operated valve, the stator solving the problem mentioned above.

Means for Solving the Problem

JP-A-2009-287663 discloses the technique which is provided with the seal member between the lower portion of the stator and the lower portion of the valve main body or the can. In the case that the structure mentioned above is employed, since the moisture does not intrude to the inner side of the stator from the lower portion of the stator, it is not necessary to mold the other portions than the portion which is opposed to the can in the magnetic pole teeth by the resin.

The present invention is made by taking the point mentioned above into consideration. In order to achieve the object mentioned above, according to the present invention, there is provided a stator of a drive motor for an electrically operated valve which is installed to an outer peripheral portion of a can attached to a valve main body having a valve port which is opened and closed by a valve member coupled to a rotor, wherein the stator comprises:

a stator assembly which is provided with a yoke having magnetic pole teeth and a coil; and a resin mold which integrally forms the stator assembly by injecting a molten resin within a metal mold, and wherein the stator comprises:

a plate having an inner diameter which is substantially the same as an inner diameter of the magnetic pole teeth, and arranged in an upper surface of the stator assembly so as to prevent the molten resin from flowing to the magnetic pole teeth side.

It is desirable that the resin mold is formed by the molten resin after the stator assembly and the plate are fitted and inserted to a protruding portion of the metal mold.

Further, it is desirable that the resin mold is formed by the molten resin which is injected from one gate provided in an upper portion of the metal mold opposed to the plate.

Further, a seal member sealing between the stator and the can or the stator and the valve main body may be provided.

DETAILED DESCRIPTION OF PREFERRED EMBODIMENT

Figure 1:
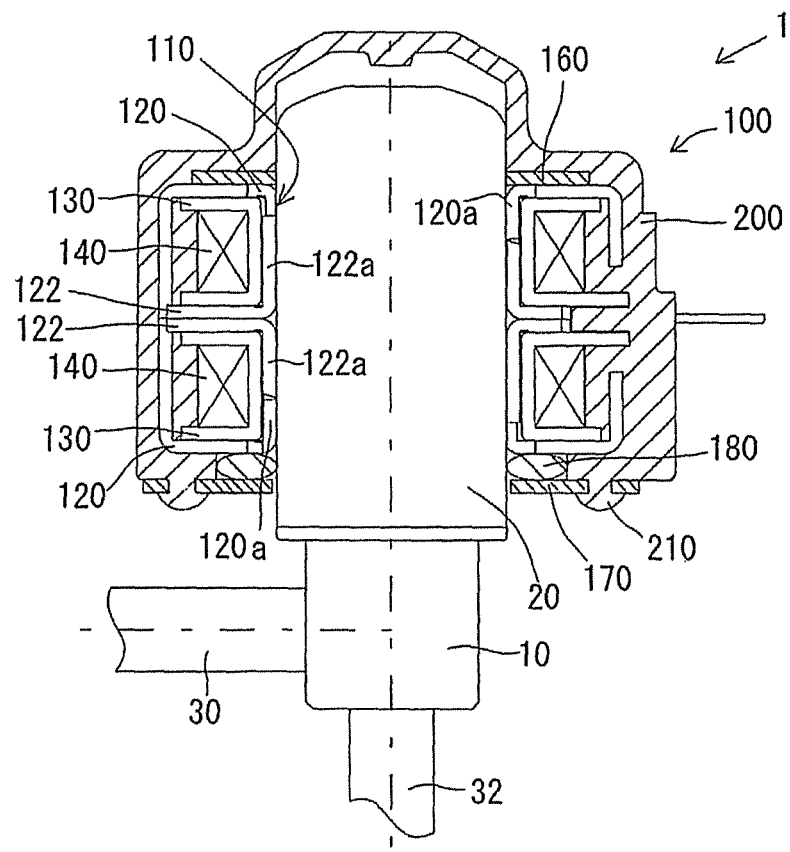
FIG. 1 is an explanatory view of an electrically operated valve which is equipped with a stator of a drive motor for an electrically operated valve according to an embodiment of the present invention.
Figure 2:
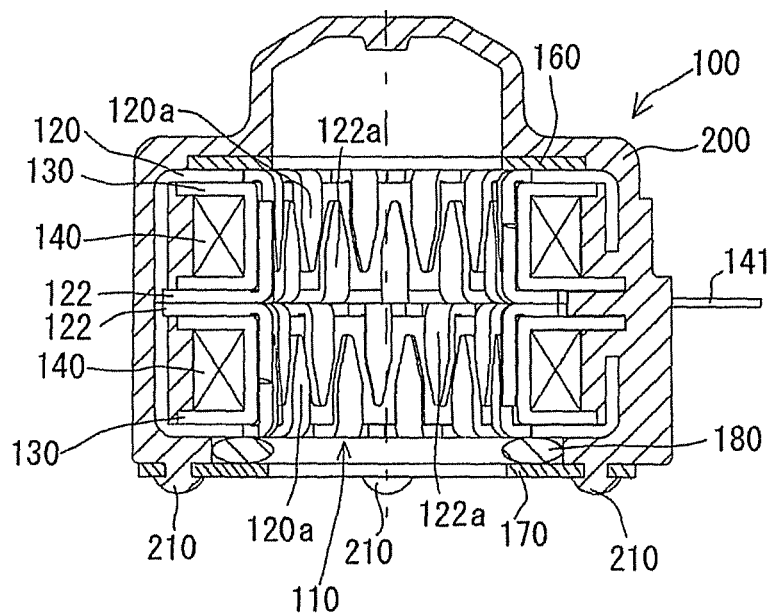
FIG. 2 is a vertical cross sectional view of the stator of the drive motor for the electrically operated valve according to the embodiment of the present invention.

FIG. 1 is an explanatory view of an electrically operated valve which is equipped with a stator according to the present invention, is a view as seen from a front face of the electrically operated valve and shows only a stator 100 by a vertical cross section, and FIG. 2 is a cross sectional view of the stator according to the present invention.

The electrically operated valve 1 has a valve main body 10, and a valve member opening and closing between a valve chamber and a valve seat of the valve chamber is arranged within the valve main body 10. Two pipings 30 and 32 communicating with the valve chamber are attached to the valve main body 10.

A can 20 serving as a sealed container is arranged in an upper portion of the valve main body 10. A rotor of the motor for driving the electrically operated valve is equipped within the can 20, and a rotation of the rotor is converted into a linear motion via a screw mechanism so as to be transmitted to a valve member. The valve member linearly moves, so that a distance between the valve member and the valve seat is adjusted, and a flow rate of a passing cooling medium is controlled.

Internal structures of the valve main body 10 and the can 20 are set to well-known appropriate structures.

Figure 3:
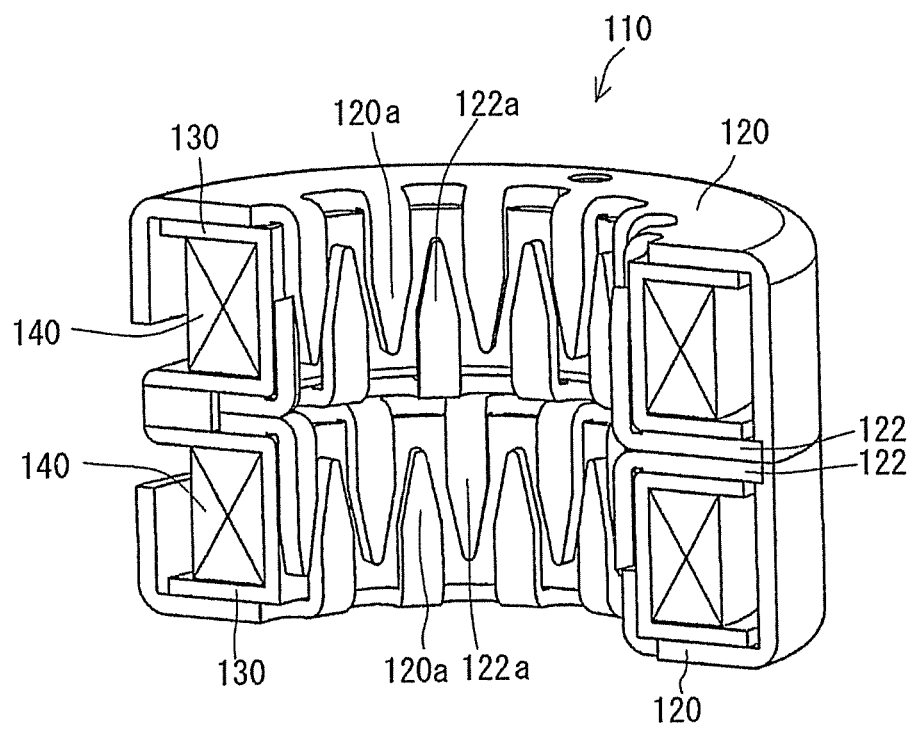
FIG. 3 is a vertical cross sectional perspective view of a stator assembly according to the embodiment of the present invention.

A stator 100 of the driving motor is detachably mounted to an outer peripheral portion of the can 20. FIG. 3 is a vertical cross sectional perspective view of a stator assembly 110.

A coil 140 wound around a bobbin 130 is retained from above and below by an outer yoke 120 which is provided with magnetic pole teeth 120a, and an inner yoke 122 which is provided with magnetic pole teeth 122a. Further, the stator assembly 110 is constructed by bringing two sets of the retaining bodies into contact with each other so as to be opposed to each other and positioning them.

Further, the stator 100 is manufactured by setting the stator assembly 110 within a metal mold and injecting a resin so as to be integrated by a resin mold 200, as mentioned later with reference to FIG. 4.

When injecting the resin, an annular plate 160 (FIG. 2) is mounted to an upper portion of the stator assembly 110. An inner diameter of the plate 160 is set to be substantially the same as an inner diameter of the outer yoke 120 and the inner yoke 122 (that is, an inner diameter of the magnetic pole teeth 120a and the magnetic pole teeth 122a).

Further, a seal member 180 such as an O-ring is arranged in a lower portion of the resin mold 200, and a seal member stopper 170 for fixing the seal member 180 to the lower portion of the stator 100 is arranged.

The seal member stopper 170 has four holes in this example, and is attached by inserting a columnar portion formed in the lower portion of the resin mold 200 to the hole so as to form a weld portion 210.

The seal member 180 prevents moisture from intruding between inner sides of the can 20 and the stator 100.

Figure 4:
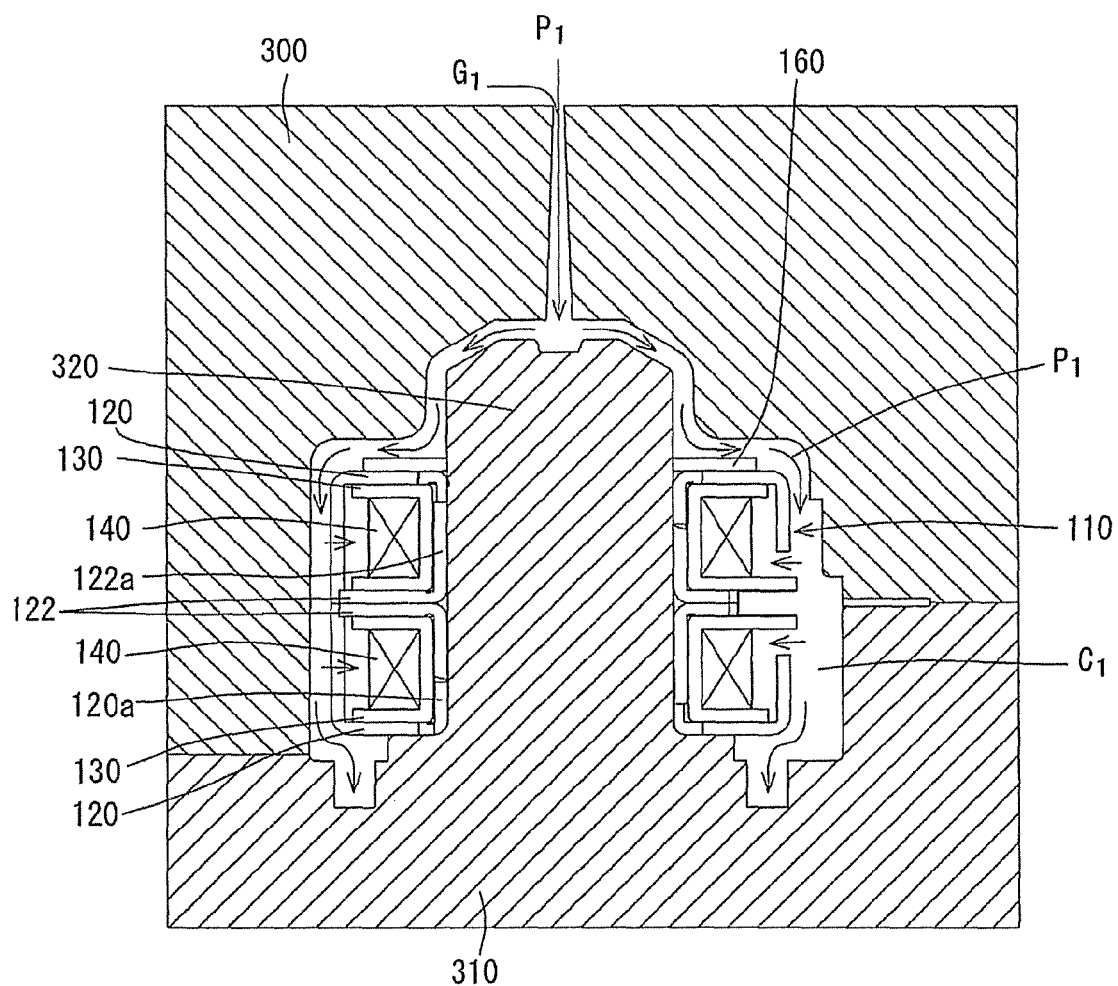
FIG. 4 is an explanatory view showing a molding method of the stator according to the embodiment of the present invention.
Figure 5:
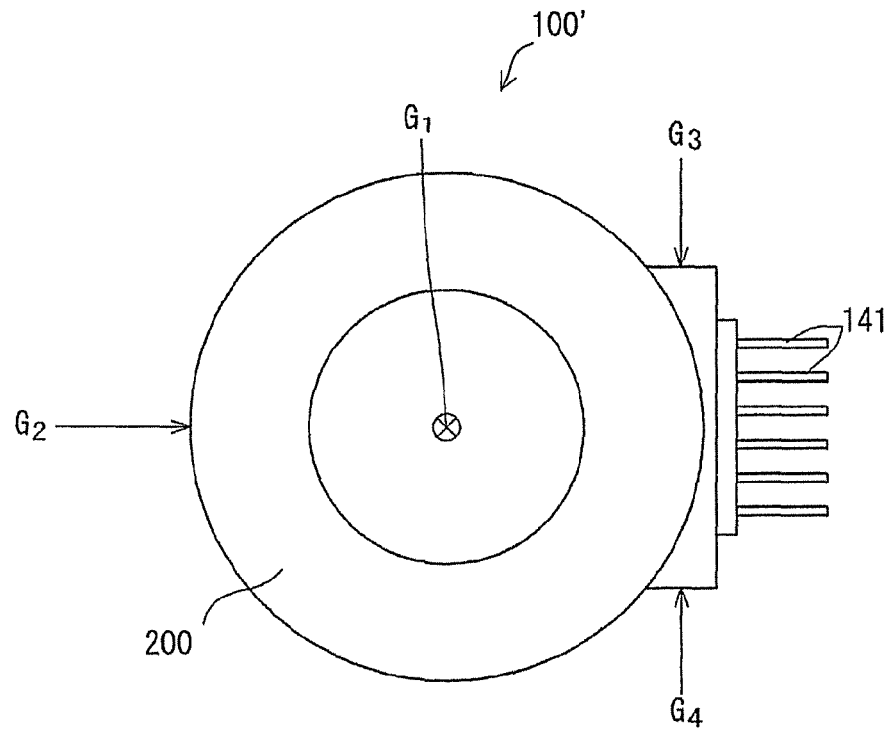
FIG. 5 is a plan view of a conventional stator.
Figure 6:
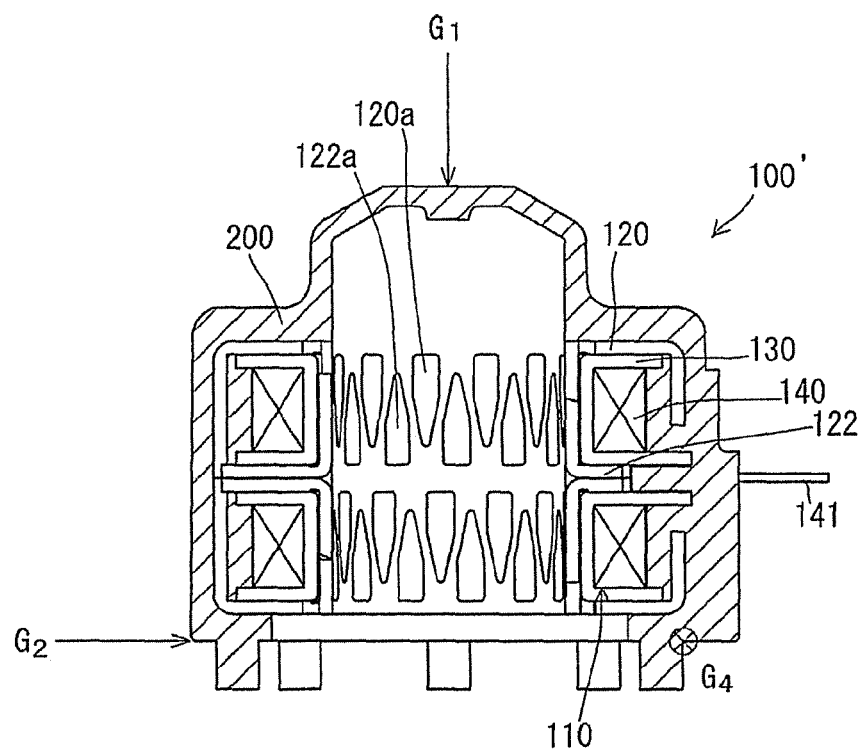
FIG. 6 is a vertical cross sectional view of the conventional stator.
Figure 7:
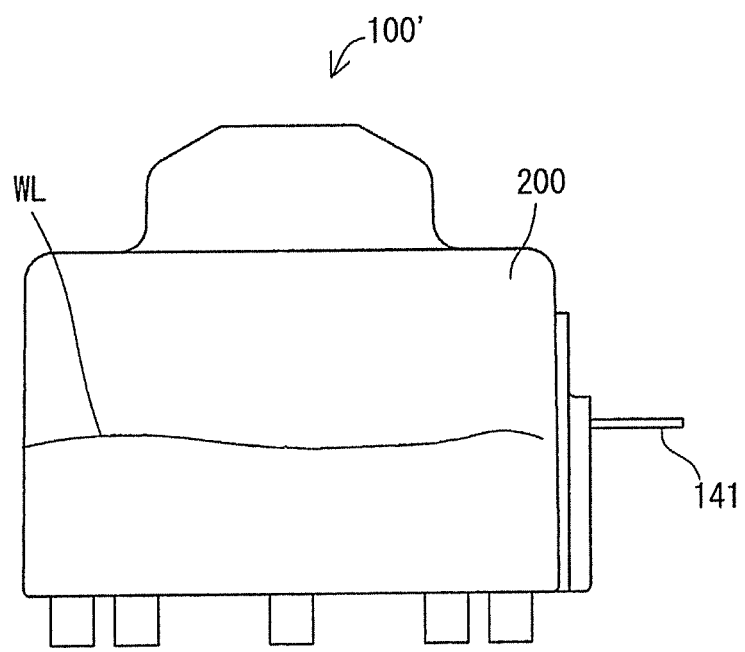
FIG. 7 is a front elevational view of the conventional stator.

FIG. 4 is an explanatory view showing a resin molding process of the stator according to the present invention.

A center portion of a lower mold 310 is provided with a cylindrical protruding portion 320 which is inserted to the inner diameter portions of the magnetic pole teeth 120a and the magnetic pole teeth 122a of the stator assembly 110, and the stator assembly 110 is fitted to the protruding portion 320. When an upper mold 300 and the lower mold 310 are closed, a cavity C1 is formed in an outer side of the stator assembly 110. A molding molten resin P1 is injected only from one gate G1 which is provided in a top portion of the upper mold 300.

In the stator according to the present invention, the annular plate 160 is mounted to the upper portion of the stator assembly 110, and an inner peripheral portion of the plate 160 comes into contact with an outer peripheral portion of the protruding portion 320.

Accordingly, the molten resin P1 injected from the gate G1 is filled in an outer side of the stator assembly 110 formed by the cavity C1 as shown by an arrow in FIG. 4 without being circulated to an inner side of the stator assembly 110 which is covered with the plate 160. A part of the resin intrudes into a complicated internal region of the stator assembly 110 via the outer yoke 120 or gaps which are appropriately provided between the outer yoke 120 and the inner yoke 122, however, does not reach at least side surfaces of the magnetic pole teeth 120a and 122a.

As mentioned above, since the resin P1 is filled only from the gate G1 at one position, the weld line is not formed in the outer peripheral portion of the resin mold 200.

Further, any inflow of the resin into the magnetic pole teeth 120a and the magnetic pole teeth 122a of the stator assembly 110 is not generated. Accordingly, a capacity of the used resin is fixed. Further, an influence applied to the coil by the inflow of the molten resin into the upper coil 140 and the lower coil 142 can be reduced.

As mentioned above, the resin does not flow into the side surfaces of the magnetic pole teeth 120a and the magnetic pole teeth 122a, however, since the seal member 180 sealing between the stator and the can is arranged in the lower portion of the stator 100 (the lower portion of the stator assembly 110), no moisture intrudes into the inner portion of the stator 100.

The seal member 180 may be structured such as to seal between the stator 100 and the valve main body 10.

Further, in the case that a seal member sealing between the stator and the can is provided in the lower portion of the can, in place of the seal member 180 provided in the lower portion of the stator 100, it is not necessary to arrange the seal member in the stator. Further, in the case that the lower portion of the stator is extended so as to cover the upper side surface of the valve main body, and the seal member sealing between the stator and the valve main body is provided in the upper side surface of the valve main body, it is not necessary to arrange the seal member in the stator in the same manner.

EFFECT OF THE INVENTION

Since the present invention is provided with the above structures, there can be obtained the preferable stator of the drive motor for the electrically operated valve which has no weld line in the outer peripheral portion of the resin mold.

What is claimed is:

1. A stator of a drive motor for an electrically operated valve which is installed to an outer peripheral portion of a can attached to a valve main body having a valve port which is opened and closed by a valve member coupled to a rotor, wherein said stator comprises:
   a stator assembly which is provided with a yoke having magnetic pole teeth and a coil; and
   a resin mold which integrally forms said stator assembly from a molten resin injected within a metal mold, and wherein said stator comprises:
   a plate having an inner diameter which is substantially the same as an inner diameter of said magnetic pole teeth, and arranged in an upper surface of the stator assembly so as to prevent the molten resin from flowing to the magnetic pole teeth side when the molten resin is injected into the metal mold,
   wherein said resin mold is formed by the molten resin which is injected from only one gate provided in an upper portion of the metal mold opposed to the plate, and cured to have no weld line in an outer peripheral portion of the resin mold.

2. The stator of the drive motor for the electrically operated valve according to claim 1, wherein said resin mold is formed by the molten resin after said stator assembly and said plate are fitted and inserted to a protruding portion of the metal mold.

3. The stator of the drive motor for the electrically operated valve according to claim 2, further comprising a seal member sealing between said stator and said can or said stator and said valve main body.

4. The stator of the drive motor for the electrically operated valve according to claim 1, further comprising a seal member sealing between said stator and said can or said stator and said valve main body.

5. A method for forming a stator of a drive motor for an electrically operated valve which is installed on an outer peripheral portion of a can attached to a valve main body having a valve port which is opened and closed by a valve member coupled to a rotor, the method for forming the stator comprising:
   providing a stator assembly with a yoke having magnetic pole teeth and a coil;
   mounting a plate to an upper surface of the stator assembly, said plate having an inner diameter which is substantially the same as an inner diameter of said magnetic pole teeth;
   setting the stator assembly within an metal mold and injecting a molten resin into said metal mold,
   wherein the plate is configured in a way such that molten resin is prevented from flowing to the magnetic pole teeth side when the molten resin is injected into the metal mold, and
   wherein injecting the molten resin into said metal mold comprises injecting the molten resin into only one gate provided in an upper portion of the metal mold opposed to the plate; and
   curing the resin mold and the stator assembly so that a weld line is not formed on an outer peripheral portion of the resin mold.

* * * * *